W. A. L. KIRK.
Green-Corn Strippers.
No. 197,145. Patented Nov. 13, 1877.
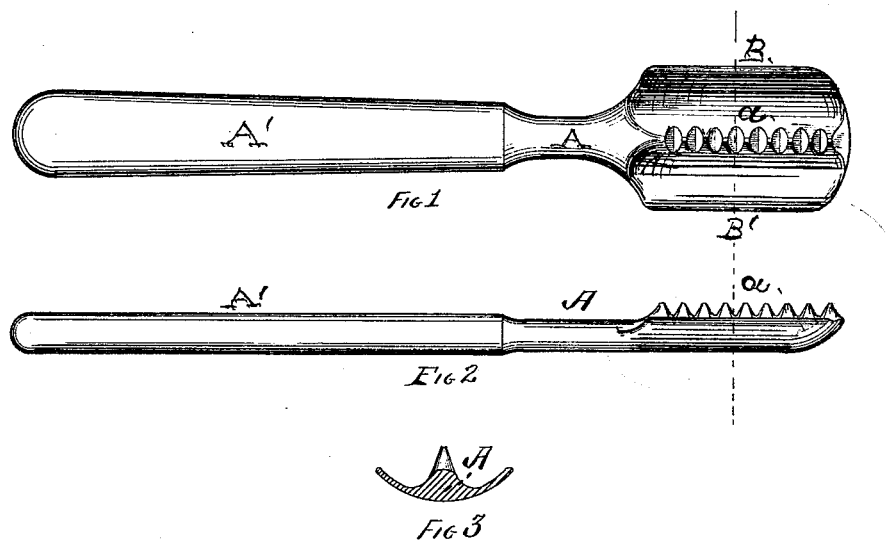

UNITED STATES PATENT OFFICE.

WILLIAM A. L. KIRK, OF HAMILTON, OHIO.

IMPROVEMENT IN GREEN-CORN STRIPPERS.

Specification forming part of Letters Patent No. 197,145, dated November 13, 1877; application filed August 28, 1877.

*To all whom it may concern:*

Be it known that I, WM. A. L. KIRK, of Hamilton, in the county of Butler and State of Ohio, have invented a new and useful Improvement in Green-Corn Strippers, which improvement is fully set forth in the following specification and accompanying drawing, in which—

Figure 1 is a plan of the implement. Fig. 2 is a side elevation, and Fig. 3 is a transverse section.

The implement is intended for removing the pulp of green corn, either cooked or uncooked, from the hull and cob, the pulp and juices being extracted and the hull left upon the cob; and it consists substantially of a handled toothed bar, which, being transversely passed longitudinally over the ear of green corn, ruptures the hulls and expresses the pulp. Guards to prevent spattering are combined with the bar, if desired.

The bar A carries conoidal teeth *a*, having a pitch of about two-tenths of an inch, and is provided with a handle, A', substantially as shown.

If thought best, the implement may be constructed with the handle at right angles to the bar; or the shape and relative position of the handle may be varied at pleasure. The handle may even be entirely omitted, and the bar soldered or otherwise attached to any handled implement, such as a knife or a fork or any fixed article, in an obvious manner.

In case the bar is attached to a fixed article, the ear of corn, instead of the bar, is the piece operated.

The guards B B', lying parallel with the bar, prevent the scattering of the pulp, and they are so placed as not to lessen the useful projection of the teeth upon the bar.

The implement may be made wholly or in part of metal or any other suitable material.

I claim as my invention—

1. The toothed bar, whose teeth are conoidal, substantially as and for the purpose described.

2. The toothed bar, whose teeth are conoidal, combined with a handle, substantially as described.

3. The toothed bar, whose teeth are conoidal, combined with a handle and guards, substantially as described, for the purpose specified.

WM. A. L. KIRK.

Witnesses:
W. N. GRAY,
G. W. ISUMINGER.